UNITED STATES PATENT OFFICE.

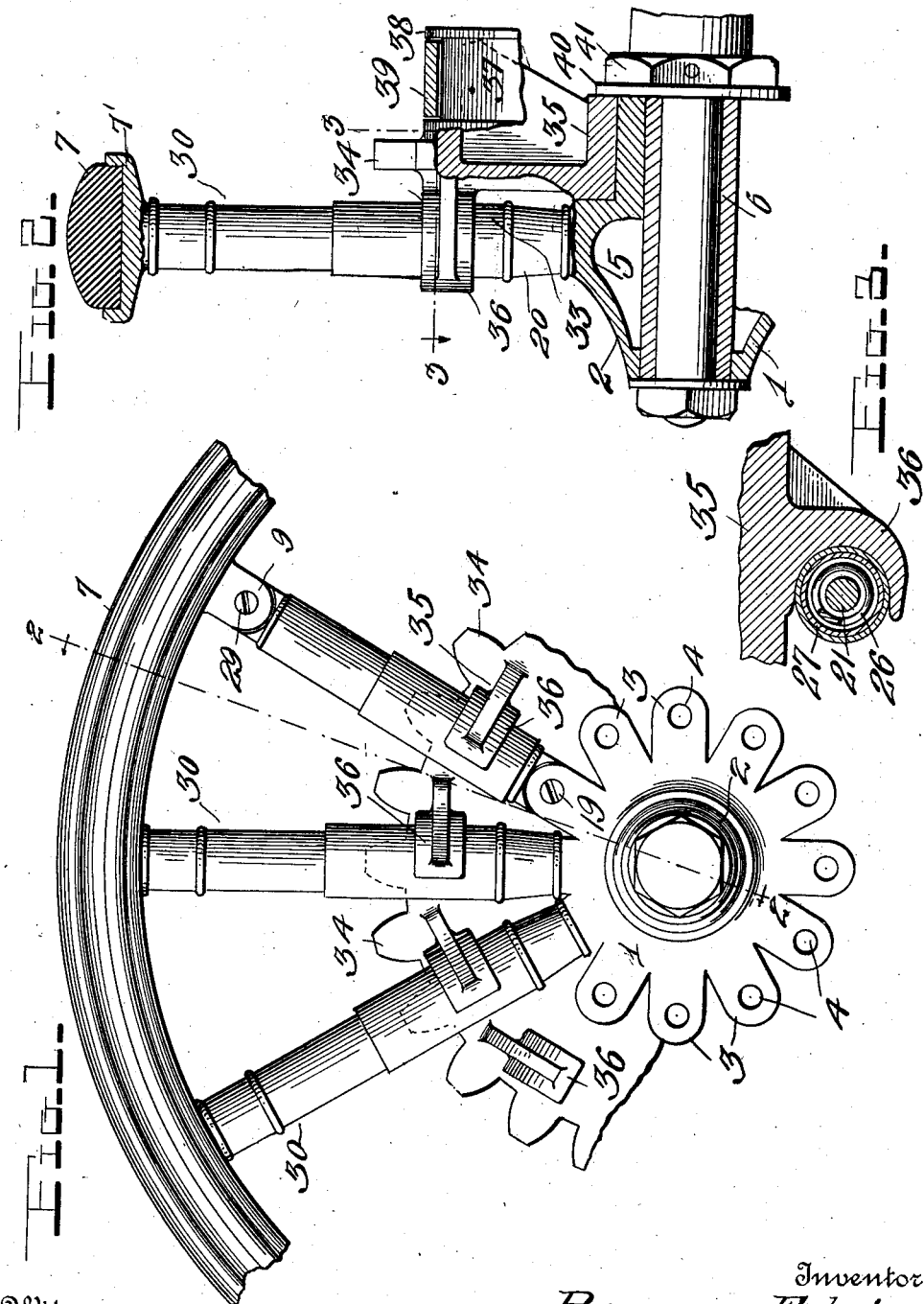

ROMAN von FABRICE, OF BROOKLYN, NEW YORK.

WHEEL.

1,010,484.  Specification of Letters Patent.  Patented Dec. 5, 1911.

Application filed December 23, 1909. Serial No. 534,654.

*To all whom it may concern:*

Be it known that I, ROMAN VON FABRICE, a citizen of the United States, residing at Brooklyn, in the county of Kings and State of New York, have invented certain new and useful Improvements in Wheels; and I do declare the following to be a full, clear, and exact description of the invention, such as will enable others skilled in the art to which it appertains to make and use the same.

This invention relates to improvements in vehicle wheels.

The object of the invention is to provide a vehicle wheel having an improved construction of cushion spokes whereby the jars and vibrations incident to the passing of the wheels over rough surfaces is nearly if not entirely absorbed.

A further object of the invention is to provide a driving device for the wheel.

With these and other objects in view, the invention consists of certain novel features of construction, combination and arrangement of parts as will be more fully described and particularly pointed out in the appended claims.

In the accompanying drawings: Figure 1 represents an enlarged sectional view of a portion of the wheel hub and several of the spokes of the driving gear; Fig. 2 is a vertical transverse section taken on the line 2—2 of Fig. 1; Fig. 3 is a detail sectional view taken on the line 3—3 of Fig. 2.

Referring to the drawings 1 indicates the hub which is preferably in the form shown and comprises an axle engaging portion 2, a series of radially projecting bifurcated ears or lugs 3, the tines of each of which are provided with a pair of transversely alined bolt receiving apertures 4, the wall of one of which is preferably threaded. If desired the body portion of the hub may be cored out as shown at 5 to reduce the weight of the hub. Any suitable means may be employed to detachably secure the hollowed hub upon the axle, in the construction shown a bushing or sleeve 6 being arranged in the bore of the hub to receive the axle. A tire 7 is shown mounted as usual in a felly 7' with which the spokes 30 are connected.

When the vehicle to which the wheels are applied is driven a driving gear in the form shown in the drawings is employed. This gear comprises a toothed wheel 34 provided with a hub encircling portion 35 adapted to fit snugly on the inner side of the wheel hub and outwardly and laterally extended hook shaped projections 36 which engage the respective spokes 30 of the wheel as is shown clearly in the drawings. The driving gear is also provided with a brake hub 37 having a peripheral groove 38 to receive a brake band 39. The gear is clamped on the hub of the wheel by a washer 40 and nut 41 and the two parts rotated together as will be readily understood. As power is applied to the gear to rotate the same, movement will be imparted to the wheel through the engagement of the projections 36 and the spokes and the transmission of the power will be even throughout the wheel as the hub serves to maintain the gear and the wheel in concentric relation.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claims.

I claim as my invention:

1. In a device of the class described, a driving gear provided with a hub to receive the hub of the wheel and a plurality of hook shaped spoke engaging members to engage the spokes of the wheel.

2. In a wheel of the class described, a hub detachably secured upon the axle, a traction wheel having a plurality of spokes pivotally connected upon said hub, and a drive gear detachably secured upon said hub and provided with a plurality of hooks adapted to engage the spokes of the wheel intermediate their ends.

In testimony whereof I have hereunto set my hand in presence of two subscribing witnesses.

ROMAN von FABRICE.

Witnesses:
  EDWARD A. FINLAYSON, Jr.,
  HAROLD L. ALT.

Copies of this patent may be obtained for five cents each, by addressing the "Commissioner of Patents, Washington, D. C."